(12) United States Patent
Sethuraman et al.

(10) Patent No.: US 6,263,021 B1
(45) Date of Patent: Jul. 17, 2001

(54) TREATING NON-ZERO QUANTIZED TRANSFORM COEFFICIENTS AS ZEROS DURING VIDEO COMPRESSION PROCESSING

(75) Inventors: Sriram Sethuraman, Hightstown; Ravi Krishnamurthy, Plainsboro, both of NJ (US)

(73) Assignees: Sarnoff Corporation, Princeton, NJ (US); LG Electronics, Inc., Seoul (KR)

( * ) Notice: Subject to any disclaimer, the term of this patent is extended or adjusted under 35 U.S.C. 154(b) by 0 days.

(21) Appl. No.: 09/262,042

(22) Filed: Mar. 4, 1999

Related U.S. Application Data

(60) Provisional application No. 60/100,939, filed on Sep. 18, 1998.

(51) Int. Cl.[7] .................................................... H04N 7/12
(52) U.S. Cl. ...................................... 375/240.03; 348/699
(58) Field of Search ........................ 375/240.03–240.05, 375/240.13, 240.2, 240.23, 240.24, 240.16; 348/699, 700; 382/236, 238, 245, 246, 248, 250, 251, 253; 341/50, 59, 51; H04N 7/12, 7/15

(56) References Cited

U.S. PATENT DOCUMENTS

| | | | |
|---|---|---|---|
| 4,922,273 | 5/1990 | Yonekawa et al. | 382/250 |
| 5,132,792 | * 7/1992 | Yonemitsu et al. | 375/240.16 |
| 5,349,384 | 9/1994 | Oguro . | |
| 5,581,360 | 12/1996 | Matsumura et al. . | |
| 5,691,770 | * 11/1997 | Keemanet et al. | 375/240.04 |
| 5,812,788 | * 9/1998 | Agarwal | 375/240.03 |
| 5,818,529 | * 10/1998 | Asamura et al. | 375/240.23 |
| 5,892,548 | * 4/1999 | Kim | 375/240.04 |

FOREIGN PATENT DOCUMENTS

| | | |
|---|---|---|
| 0 739 141 | 10/1996 | (EP) . |
| 0 785 689 | 7/1997 | (EP) . |

OTHER PUBLICATIONS

PCT International Search Report corresponding to PCT Applicatin US99/21831.
Crouse M Et Al: "Joint Thresholding and Quantizer Selection for Transform Image Coding: Entropy–Constrained Analysis and Applications to Baseline JPEG" IEEE Transactions on Image Processing, US, IEEE Inc. New York, vol. 6, No. 2, p. 285–297 XP000642647 ISSN: 1057–7149 the whole document.

* cited by examiner

*Primary Examiner*—Howard Britton
*Assistant Examiner*—Nhon T Diep
(74) *Attorney, Agent, or Firm*—William J. Burke

(57) ABSTRACT

During video coding, a transform such as a discrete cosine transform (DCT) is applied to blocks of image data (e.g., motion-compensated interframe pixel differences) and the resulting transform coefficients for each block are quantized at a specified quantization level. Notwithstanding the fact that some coefficients are quantized to non-zero values, at least one non-zero quantized coefficient is treated as if it had a value of zero for purposes of further processing (e.g., run-length encoding (RLE) the quantized data). When segmentation analysis is performed to identify two or more different regions of interest in each frame, the number of coefficients that are treated as having a value of zero for RLE is different for different regions of interest (e.g., more coefficients for less-important regions). In this way, the number of bits used to encode image data are reduced to satisfy bit rate requirements without (1) having to drop frames adaptively, while (2) conforming to constraints that may be imposed on the magnitude of change in quantization level from frame to frame.

16 Claims, 3 Drawing Sheets

FIG. 2

| C0 | C1 | C5 | C6 | C14 | C15 | C27 | C28 |
|----|----|----|----|-----|-----|-----|-----|
| C2 | C4 | C7 | C13 | C16 | C26 | C29 | C42 |
| C3 | C8 | C12 | C17 | C25 | C30 | C41 | C43 |
| C9 | C11 | C18 | C24 | C31 | C40 | C44 | C53 |
| C10 | C19 | C23 | C32 | C39 | C45 | C52 | C54 |
| C20 | C22 | C33 | C38 | C46 | C51 | C55 | C60 |
| C21 | C34 | C37 | C47 | C50 | C56 | C59 | C61 |
| C35 | C36 | C48 | C49 | C57 | C58 | C62 | C63 |

FIG. 3

| Q0 | 0 | 0 | Q6 | 0 | 0 | 0 | 0 |
|---|---|---|---|---|---|---|---|
| Q2 | 0 | 0 | Q13 | 0 | 0 | 0 | 0 |
| 0 | 0 | 0 | 0 | 0 | 0 | 0 | 0 |
| Q9 | 0 | 0 | 0 | Q31 | 0 | 0 | 0 |
| 0 | 0 | Q23 | 0 | 0 | 0 | 0 | 0 |
| 0 | 0 | 0 | 0 | 0 | 0 | 0 | 0 |
| 0 | 0 | 0 | 0 | Q50 | 0 | 0 | 0 |
| 0 | 0 | 0 | 0 | 0 | 0 | 0 | 0 |

TREATING NON-ZERO QUANTIZED TRANSFORM COEFFICIENTS AS ZEROS DURING VIDEO COMPRESSION PROCESSING

CROSS-REFERENCE TO RELATED APPLICATIONS

This application claims the benefit of the filing date of U.S. Provisional Application No. 60/100,939, filed on Sep. 18, 1998.

BACKGROUND OF THE INVENTION

1. Field of the Invention

The present invention relates to video compression processing, and, in particular, to rate control in a video coder.

2. Description of the Related Art

The primary goal in video compression processing is to reduce the number of bits used to represent sequences of video images while still maintaining an acceptable level of image quality during playback of the resulting compressed video bitstream. Another goal in many video compression applications is to maintain a relatively uniform bit rate, for example, to satisfy transmission bandwidth and/or playback processing constraints.

Video compression processing often involves the tradeoff between bit rate and playback quality. This tradeoff typically involves reducing the average numbers of bits used to encode images in the original video sequence by selectively decreasing the playback quality of each image that is encoded into the compressed video bitstream. Alternatively or in addition, the tradeoff between bit rate and playback quality can involve skipping certain images in the original video sequence, thereby encoding only a subset of those original images into the resulting compressed video bitstream.

Conventional video compression algorithms dictate a regular pattern of image skipping, e.g., skip every other image in the original video sequence. A video encoder may also be able to skip additional images, selected adaptively as needed to satisfy bit rate requirements. The decision to skip one or more images outside of a regular pattern of image skipping should not be made lightly, because of the adverse effects of such non-uniform image skipping to the quality of the video playback. A non-uniform skipping of images can be extremely annoying to a viewer who prefers to see a regular sequence of video images in which images are presented at a uniform frame rate.

As described above, the primary approach for controlling bit rate is to decrease selectively the quality of each image in the encoded video bitstream. One known technique for such rate control relies on a process called segmentation in which each encoded image is analyzed to identify two or more different regions having different levels of importance to the overall quality of the video playback, where those different regions within each frame are themselves treated differently during the encoding process.

For example, the videoconferencing paradigm is a "talking head" centered on a relatively constant background, where "constant" may refer to both time (i.e., background not changing significantly from frame to frame) and space (i.e., background not changing significantly from pixel to pixel within a frame). For such applications, segmentation analysis is performed during the encoding process to identify those regions of each frame that correspond to the talking head and those regions corresponding to the background, where the various regions are specified in terms of macroblocks of pixel data (e.g., each macroblock corresponds to a 16×16 block of pixels). When the frame is encoded, the regions corresponding to the talking head are allocated more resources (e.g., more bits per pixel on average) than those regions corresponding to the background, since the talking head is "more important" to the viewer of the video playback.

In many video coding schemes, a transform, such as a two-dimensional discrete cosine transform (DCT) is applied to blocks (e.g., four 8×8 blocks per macroblock) of image data (either the pixels themselves or interframe pixel differences corresponding to those pixels). The resulting transform coefficients are then quantized at a selected quantization level where many of the coefficients are typically quantized to a zero value. The quantized coefficients are then run-length and variable-length encoded to generate part of the compressed video bitstream. In general, greater quantization levels result in more DCT coefficients being quantized to zero and fewer bits being required to represent the image data after performing run-length and variable-length encoding.

In a typical encoding scheme that relies on segmentation, the transform coefficients corresponding to those blocks of image data in the more-important regions are less severely quantized than those coefficients corresponding to the less-important regions. In this way, relatively more data (i.e., information) is preserved for the more-important regions than for the less-important regions.

Some video coding schemes limit the magnitude of change in quantization level from frame to frame in a video sequence. Under such a constraint, it may be impossible for conventional video coders to meet imposed bit rate requirements without adaptively dropping additional frames, even those coders that apply different quantization levels to different regions identified by performing segmentation analysis on each image.

SUMMARY OF THE INVENTION

The present invention is directed to a technique for encoding video images, in which certain transform coefficients are ignored (i.e., treated as having a zero value), even if they quantize to non-zero values using the selected quantization level. When segmentation analysis is performed and different quantization levels are applied to different regions of each image, different numbers of coefficients are ignored, under the present invention.

In one embodiment, the present invention is a method for encoding a video image, comprising the steps of (a) generating blocks of image data for the video image; (b) applying a transform to each block of image data to generate blocks of transform coefficients; (c) quantizing each block of transform coefficients to generate blocks of quantized coefficients; (d) performing segmentation analysis for the video image to identify two or more different regions of interest; and (e) further processing each block of quantized coefficients to generate compressed video data. At least one non-zero quantized coefficient is treated as having a value of zero for the further processing, and different numbers of coefficients are treated as having a value of zero for the further processing for blocks of different regions of interest independent of whether or not the coefficients are quantized to zero in step (c).

BRIEF DESCRIPTION OF THE DRAWINGS

Other aspects, features, and advantages of the present invention will become more fully apparent from the follow

FIG. 2 shows a generic (8×8) block of DCT coefficient data generated by the video coder of FIG. 1; and FIG. 3 shows an exemplary (8×8) block of quantized DCT coefficient data.

DETAILED DESCRIPTION

Figure 1:
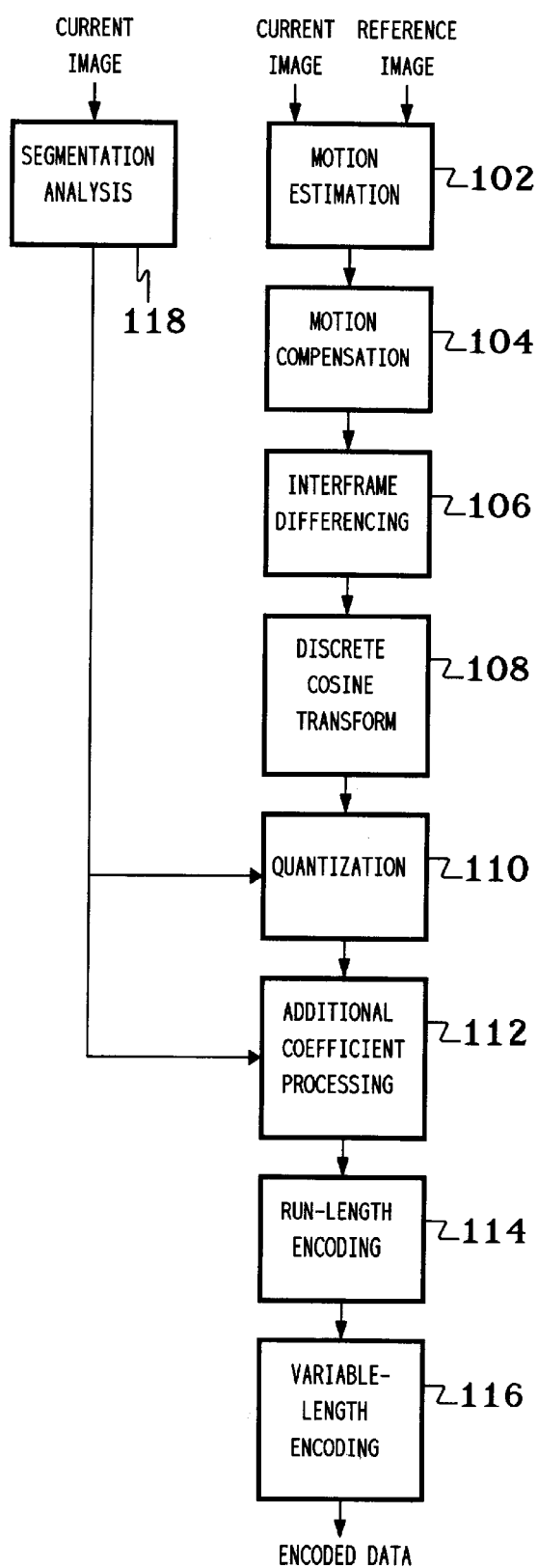
- FIG. 1 shows a block diagram of the main processing path implemented by an exemplary video coder, according to one embodiment of the present invention.

FIG. 1 shows a block diagram of the main processing path implemented by an exemplary video coder 100, according to one embodiment of the present invention. For predictive encoding (e.g., a P or B frame), video coder 100 performs motion estimation to identify motion vectors for the current frame relative to its reference frame (step 102). Video coder 100 uses the selected motion vectors to generate motion-compensated image data from the reference image data (step 104) for use in generating interframe pixel differences for the current image (step 106).

Video coder 100 then applies a discrete cosine transform to each (8×8) block of interframe pixel differences to generate (8×8) blocks of DCT coefficient data (step 108). FIG. 2 shows a generic (8×8) block of DCT coefficient data $c_i$, where $c_0$ is the coefficient with the lowest spatial frequency (i.e., the DC term) and $c_{63}$ is the coefficient with the highest spatial frequency. Other embodiments of the present invention may employ other transform schemes, including transforms other than the DCT transform and/or block sizes other than (8×8).

Along another path, video coder 100 optionally performs segmentation analysis to identify two or more regions of different interest level for the current image (e.g., a more-important foreground region and one or more less-important background regions) (step 118). Video coder 100 quantizes the blocks of DCT coefficients using quantization levels selected for the various regions identified during the segmentation analysis (step 110). Typically (although not necessarily), lower quantization levels (i.e., less severe quantization) are selected for the more-important regions. If segmentation analysis is not performed, then the same quantization level is selected for the entire image.

In some implementations, the quantization of step 110 is implemented by dividing each coefficient in FIG. 2 by a single specified quantizer value to generate the quantized coefficients. In other implementations, the quantization level may correspond to an (8×8) quantizer matrix in which the quantizer value used to quantize the DCT coefficients can change from location to location within the (8×8) block. In either case, the result of quantization is that some, if not many, of the DCT coefficients are quantized to a value of zero.

In conventional video coding, run-length and variable-length encoding are implemented immediately following quantization. During run-length encoding, the quantized coefficients may be converted into run-length codes corresponding to non-zero quantized coefficients and runs of zero quantized coefficients, following the zig-zag pattern of FIG. 2. For typical video images, for a given quantization level, coefficients having higher spatial frequency are more likely to be quantized to zero than those coefficients having lower spatial frequency. Similarly, in general, higher quantization levels imply fewer non-zero quantized coefficients.

According to the present invention, additional coefficient processing (step 112) is performed on the quantized coefficients prior to run-length encoding (step 114) and variable-length encoding (step 116). This additional coefficient processing results in one or more DCT coefficients that are quantized to non-zero values, nevertheless being treated as having a zero value for run-length encoding.

For example, in one implementation, a specified number of DCT coefficients (e.g., the last n coefficients in the zig-zag pattern of FIG. 2) are treated as having a zero value, no matter what the results are of the quantization of step 110. Assume, for example, that FIG. 3 shows the quantized coefficients qi that result from quantizing the coefficients ci of FIG. 2. As shown in FIG. 3, only 8 of the DCT coefficients ci have non-zero quantized values qi. Assume further that, according to the present invention, the additional coefficient processing of step 112 specifies that the last 30 coefficients are treated as zero no matter what happens during the quantization of step 110. In that case, quantized coefficient q50 is treated as having a value of zero during the run-length encoding of step 114, even though the quantized value of coefficient c50 was not zero for the quantization level for that block of data.

In another implementation of the additional coefficient processing of step 112, a specified number m of non-zero quantized coefficients are treated as having a value of zero for purposes of run-length encoding. Referring again to FIG. 3, assume that the additional coefficient processing of step 112 specifies that the last two non-zero quantized coefficients in the zig-zag pattern are to be treated as having a value of zero for run-length encoding. In that case, non-zero quantized coefficients q31 and q50 are treated as having a value of zero during run-length encoding. This implementation is not limited a priori to specific coefficients as in the previous implementation. In this implementation, an exception may be made for the DC coefficients of intra-coded blocks, such that no matter how few quantized coefficients have a non-zero value, the quantized DC coefficient will never be arbitrarily ignored.

In either implementation, according to the present invention, when segmentation analysis is performed, the additional coefficient processing of step 112 treats regions of the same image having different levels of importance differently. For example, the number of coefficients to treat as having a value of zero is larger for the regions of lesser importance than the number of coefficients for the regions of greater importance, thereby once again preserving relatively more information for the regions of greater importance. In some implementations, the additional coefficient processing of step 112 may leave the most-important regions unchanged from the quantization of step 110 and only apply additional coefficient processing to the least-important regions.

The present invention provides a mechanism for reducing the number of bits used to encode image data to satisfy bit rate requirements without (1) having to drop frames adaptively, while (2) conforming to constraints that may be imposed (e.g., by the video compression standard) on the magnitude of change in quantization level from macroblock to macroblock within a frame, when the bits per frame may otherwise exceed a specified frame-level target.

The present invention has been discussed in the context of inter-coded blocks in which a transform is applied to interframe pixel differences. As alluded to earlier, the present invention can also be implemented for intra-coded blocks in which a transform is applied to raw pixel data. Similarly, the present invention has been discussed in the context of video compression algorithms that rely on run-length encoding following the quantization step. The present invention can also be implemented for video compression algorithms that do not rely on RLE processing following the quantization step.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims

What is claimed is:

1. A method for encoding a video image, comprising the steps of:

(a) generating blocks of image data for the video image;

(b) applying a transform to each block of image data to generate blocks of transform coefficients;

(c) quantizing each block of transform coefficients to generate blocks of quantized coefficients;

(d) performing segmentation analysis for the video image based on imagery in the video image to identify two or more different regions of interest, wherein each region of interest comprises a plurality of blocks; and (e) further processing each block of quantized coefficients to generate compressed video data, wherein:

at least one non-zero quantized coefficient is treated as having a value of zero for the further processing; and different numbers of coefficients are treated as having a value of zero for the further processing for blocks of different regions of interest independent of whether or not the coefficients are quantized to zero in step (c).

2. The invention of claim 1, wherein:

the image data are motion-compensated interframe pixel differences;

the transform is an (8×8) discrete cosine transform; and step (e) comprises the steps of run-length encoding (RLE) each block of quantized coefficients using a zig-zag pattern to generate RLE data and variable-length encoding the RLE data.

3. The invention of claim 1, wherein step (c) comprises the step of quantizing blocks of different regions using different quantization levels.

4. The invention of claim 3, wherein a less-important region is quantized more severely than a more-important region.

5. The invention of claim 1, wherein more non-zero quantized coefficients are treated as having a value of zero for the further processing for blocks of a less-important region than for blocks of a more-important region.

6. The invention of claim 5, wherein no non-zero quantized coefficients are treated as having a value of zero for the further processing for a most-important region.

7. The invention of claim 1, wherein a number of non-zero quantized coefficients to be treated as having a value of zero for the further processing is specified for each block.

8. The invention of claim 1, wherein specific coefficients are identified to be treated as having a value of zero for the further processing for each block independent of whether the specific coefficients are quantized to zero.

9. A computer-readable medium having stored thereon a plurality of instructions, the plurality of instructions including instructions which, when executed by a processor, cause the processor to implement a method for encoding a video image, the method comprising the steps of:

(a) generating blocks of image data for the video image;

(b) applying a transform to each block of image data to generate blocks of transform coefficients;

(c) quantizing each block of transform coefficients to generate blocks of quantized coefficients;

(d) performing segmentation analysis for the video image based on imagery in the video image to identify two or more different regions of interest, wherein each region of interest comprises a plurality of blocks; and (e) further processing each block of quantized coefficients to generate compressed video data, wherein:

at least one non-zero quantized coefficient is treated as having a value of zero for the further processing; and different numbers of coefficients are treated as having a value of zero for the further processing for blocks of different regions of interest independent of whether or not the coefficients are quantized to zero in step (c).

10. The invention of claim 9, wherein:

the image data are motion-compensated interframe pixel differences;

the transform is an (8×8) discrete cosine transform; and step (e) comprises the steps of run-length encoding (RLE) each block of quantized coefficients using a zig-zag pattern to generate RLE data and variable-length encoding the RLE data.

11. The invention of claim 9, wherein step (c) comprises the step of quantizing blocks of different regions using different quantization levels.

12. The invention of claim 11, wherein a less-important region is quantized more severely than a more-important region.

13. The invention of claim 9, wherein more non-zero quantized coefficients are treated as having a value of zero for the further processing for blocks of a less-important region than for blocks of a more-important region.

14. The invention of claim 13, wherein no non-zero quantized coefficients are treated as having a value of zero for the other processing for a most-important region.

15. The invention of claim 9, wherein a number of non-zero quantized coefficients to be treated as having a value of zero for the further processing is specified for each block.

16. The invention of claim 9, wherein specific coefficients are identified to be treated as having a value of zero for the further processing for each block independent of whether the specific coefficients are quantized to zero.

* * * * *